Patented Mar. 14, 1950

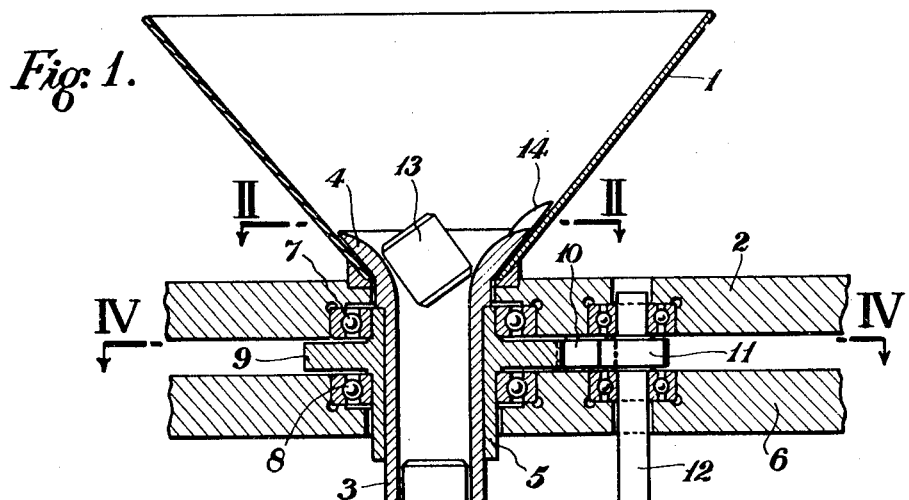
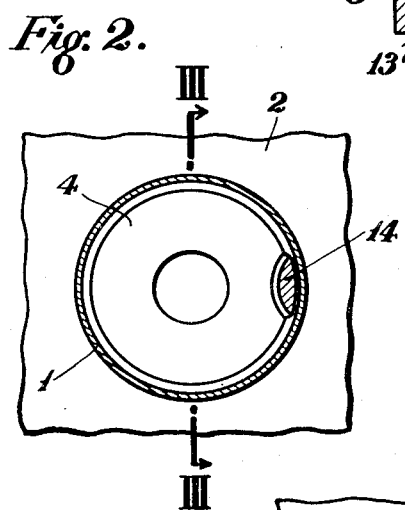
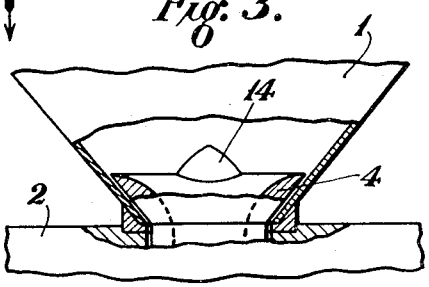
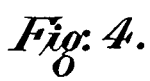
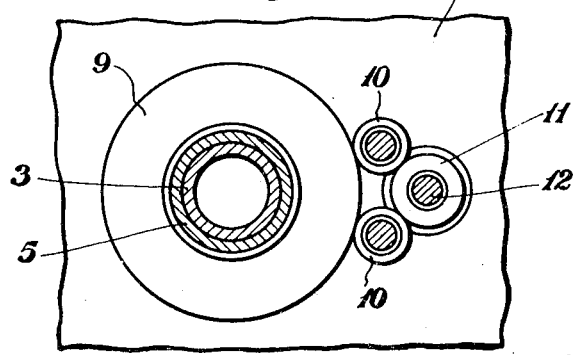

2,500,698

UNITED STATES PATENT OFFICE 2,500,698

HOPPER FEED APPARATUS

John Penrose Mills, Wolverhampton, England, assignor to The Timken Roller Bearing Company, Canton, Ohio, a corporation of Ohio Application October 4, 1946, Serial No. 701,233
In Great Britain October 31, 1945

2 Claims. (Cl. 222—411)

This invention relates to hopper feed apparatus for feeding or delivering articles in succession to any desired delivery point, said apparatus being of the kind comprising a fixed hopper into which articles are supplied in bulk and which is provided with a mechanically-driven rotary shoot or delivery tube wherethrough the articles are fed in succession.

The object of the present invention is to provide an improved hopper feed apparatus, of the kind referred to, which is especially suitable for feeding small cylindrical articles (such as rollers or cylindrical workpieces) in axial alignment through the shoot or delivery tube, without risk of jamming occuring at the junction of the hopper with the said shoot or tube.

According to the invention, a hopper feed apparatus comprises a fixed hopper in combination with a mechanically-driven rotary shoot or delivery tube having at its upper end a flared or bell-mouthed funnel part which rotates within the lower portion of the hopper.

Figure 1 of the accompanying drawings is a vertical section through a hopper feed apparatus in accordance with the present invention.

Figure 2 is a horizontal section on line II—II, Figure 1.

Figure 3 is a section through the lower part of the hopper in a plane at right-angles, to the plane of the section shown in Figure 1, namely, corresponding to line III—III, Figure 2.

Figure 4 is a horizontal section on line IV—IV, Figure 1, showing the friction drive diagrammatically.

Referring to the said drawings, which show a convenient embodiment of the invention in connection with a hopper feed apparatus designed for feeding rollers or cylindrical workpieces (hereinafter referred to as rollers), the apparatus comprises a conical-shaped circular fixed hopper 1 supported upon a stationary part 2 in any suitable manner and into which the rollers, all of substantially the same diameter, are supplied in bulk, so that they take indiscriminate positions therein. Mounted in an opening in the lower end of the hopper is a vertical shoot or delivery tube 3 having an internal diameter only slightly greater than the diameter of the rollers, the bore of the shoot preferably being a clearance fit to the diameter of the said rollers. The upper end of this shoot 3 is conically flared to form a bell-mouthed funnel 4 which is located within (preferably with a clearance fit) the interior of the lower portion of the hopper, adjacent the bottom opening therein, the angle of the exterior funnel side surface being the same as that of the hopper sides. Preferably the interior surface of the funnel 4 is of a convex section in a vertical plane, the radius of curvature of the convex surface being equal to the roller diameter, although this radius may vary from a maximum of 1.5 times the roller diameter to a minimum of .5 times the roller diameter.

The shoot 3 is carried by a sleeve 5 fixed thereto and rotatably mounted in stationary supporting parts 2, 6, through the medium of antifriction bearings 7, 8, the shoot being supported so that there is just a clearance fit between the funnel 4 and the hopper 1. It is mechanically and continuously rotated about its vertical axis by any convenient means from any source of power, such as from a machine to which the rollers are to be supplied. As shown in the drawings, by way of example, a collar 9 integral with the sleeve 5 is driven through friction wheels 10, 10 (shown diagrammatically in Figure 4), from a friction pinion 11 on a vertical shaft 12 mounted in bearings in the supporting parts 2, 6, said shaft 12 being driven from the machine to which the rollers are to be delivered.

By reason of the rotation of the shoot 3 combined with the action of the funnel 4 rotating within the hopper in close proximity to the wall thereof, the rollers, as they enter the funnel, are caused first to assume a radial tilted position, as in the case of the roller indicated at 13 in Figure 1, and then, as they move downwards, are constrained progressively more and more to assume a vertical position until they fall in succession through the shoot, as indicated by roller 13¹ in Figure 1, with their axes vertical. The rollers may be delivered from the lower end of the shoot, and thence fed to any desired point on a machine in which they are to be treated or operated upon. They may, for example, be delivered to an oscillating drum device which feeds them one at a time to a shoot which leads them to the required point on the machine.

The funnel 4 may be provided at its upper edge with a finger or projection 14 which acts as an agitator during the revolution of the funnel. This finger may have a double convex section, one of the convex surfaces corresponding to and closely fitting the surface of the hopper, and the other being adapted to engage the rollers in the hopper. This sectional shape is shown in Figure 2.

I claim:

1. A hopper feed apparatus comprising a fixed circular hopper, a rotatably mounted delivery shoot below the hopper, mechanical means for rotating the shoot, and a rotating funnel part carcaried by the upper end of the shoot, said funnel part being adapted to rotate within the lower portion of the hopper in close proximity thereto and having an inner surface which is convex in a plane radial to the axis of the shoot.

2. A hopper feed apparatus for feeding cylindrical articles comprising a fixed circular hopper, a rotatably mounted delivery shoot below the hopper and having a bore approximately equal to the diameter of the cylindrical articles to be fed, mechanical means for rotating the shoot, and a rotating conical funnel part rigidly carried by the upper end of the shoot, said funnel part being adapted to rotate within the lower portion of the hopper in close proximity thereto and having an interior surface which is convex in a plane radial to the axis of the shoot and which is of a radius within the limits of one-half to one and one-half times the radius of the cylindrical articles which are to be fed.

JOHN PENROSE MILLS.

REFERENCES CITED

The following references are of record in the file of this patent:

UNITED STATES PATENTS

| Number | Name | Date |
|---|---|---|
| 1,031,589 | Russell | July 2, 1912 |
| 2,062,854 | Yager et al. | Dec. 1, 1936 |